United States Patent
Jung et al.

(10) Patent No.: US 11,463,899 B2
(45) Date of Patent: Oct. 4, 2022

(54) APPARATUS AND METHOD FOR CONTROLLING MEASUREMENT OPERATIONS IN WIRELESS COMMUNICATION SYSTEM

(71) Applicant: Samsung Electronics Co., Ltd., Suwon-si (KR)

(72) Inventors: Jongpil Jung, Suwon-si (KR); Hanseok Kim, Suwon-si (KR); Dongsook Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 132 days.

(21) Appl. No.: 16/670,062

(22) Filed: Oct. 31, 2019

(65) Prior Publication Data
US 2020/0137609 A1    Apr. 30, 2020

Related U.S. Application Data

(60) Provisional application No. 62/753,160, filed on Oct. 31, 2018.

(30) Foreign Application Priority Data

Oct. 17, 2019 (KR) .................. 10-2019-0129144

(51) Int. Cl.
*H04W 24/10* (2009.01)
(52) U.S. Cl.
CPC ................... *H04W 24/10* (2013.01)
(58) Field of Classification Search
CPC ...................................... H04W 24/10
See application file for complete search history.

(56) References Cited

U.S. PATENT DOCUMENTS

| 7,760,676 B2 | 7/2010 | Demirhan et al. |
| 8,285,346 B2 | 10/2012 | Fodor et al. |
| 8,755,313 B2 | 6/2014 | Damnjanovic et al. |

(Continued)

FOREIGN PATENT DOCUMENTS

| EP | 2 523 496 A1 | 11/2012 |
| EP | 3 355 609 A1 | 8/2018 |
| WO | 2017/031018 A1 | 2/2017 |

OTHER PUBLICATIONS

Ericsson, "Measurement requirements for deactivated secondary component carriers", 3GPP TSG-RAN WG2 #103, Gothenburg, Sweden, Aug. 20-24, 2018, R2-1812236 (Year: 2018).*

(Continued)

*Primary Examiner* — Joseph A Bednash
(74) *Attorney, Agent, or Firm* — Jefferson IP Law, LLP

(57) ABSTRACT

The method and apparatus relate to a 5th generation (5G) or pre-5G communication system for supporting a higher data rate after a 4th generation (4G) communication system such as long-term evolution (LTE). A method for controlling a measurement operation in a wireless communication system, and an apparatus therefor are provided. The method includes an operation method of a terminal including receiving a message for controlling a measurement operation from a base station, and controlling a measurement operation based on the message. The message including information indicating an object for the application of the controlled measurement operation.

19 Claims, 18 Drawing Sheets

(56) References Cited

U.S. PATENT DOCUMENTS

| | | | |
|---|---|---|---|
| 9,042,279 B2 | 5/2015 | Fan et al. | |
| 2015/0373597 A1* | 12/2015 | Kim | H04W 36/0016 |
| | | | 455/436 |
| 2016/0007284 A1* | 1/2016 | Futaki | H04W 48/00 |
| | | | 370/311 |
| 2017/0272553 A1* | 9/2017 | Yi | H04L 1/1887 |
| 2018/0092085 A1 | 3/2018 | Shaheen et al. | |
| 2020/0022215 A1* | 1/2020 | Takahashi | H04W 76/27 |
| 2020/0029389 A1* | 1/2020 | Yilmaz | H04W 76/18 |

OTHER PUBLICATIONS

CATT, "Remaining issues of early measurement configurations"; 3GPP TSG-RAN WG1 Meeting #107bis, Chongqing, P.R. China, Oct. 14-18, 2019; R2-1912115 (Year: 2019).*

Huawei et al., "Idle/inactive NR measurements in LTE and NR"; 3GPP TSG-RAN WG1 Meeting #107bis, Chongqing, P.R. China, Oct. 14-18, 2019; R2-1913615 (Year: 2019).*

3rd Generation Partnership Project; Technical Specification Group Radio Access Network; NR;Radio Resource Control (RRC) protocol specification; 3GPP TS 38.331 V15.7.0; Release 15; Sep. 2019.

CATT, CMCC, vivo, CATR, Qualcomm, MediaTek; 3GPP TSG RAN Meetings #80; RP-181463; Study on UE Power Saving in NR; Jun. 14, 2018; La Jolla, USA.

Ericsson; Configuration of CGI reporting, 3GPP TSG-RAN WG2 NR #101; Tdoc R2-1803333; Mar. 2, 2018, Athens, Greece.

Qualcomm Incorporated; Fast SCell Configuration through Quick SCell Measurement Reporting, 3GPP TSG-RAN2 Meeting #101 bis, R2-1804546; Apr. 20, 2018, Sanya, Athens.

Nokia, Nokia Shanghai Bell; Finalizing IDLE mode measurements for euCA, 3GPP TSG-RAN WG2 Meeting #102; R2-1806772; May 25, 2018, Busan, South Korea.

Nokia, Nokia Shanghai Bell; Security aspects of IDLE mode measurements, 3GPP TSG-RAN WG2 #101; R2-1802753; Mar. 2, 2018, Athens, Greece.

International Search Report dated Feb. 19, 2020, issued in an International Application No. PCT/KR2019/014629.

Nokia, Nokia Shanghai Bell, "Finalizing IDLE mode measurements for euCA", 3GPP TSG-RAN WG2 Meeting #102, R2-1806772, Busan, South Korea, May 21-25, 2018.

European Search Report dated Nov. 8, 2021, issued in European Application No. 19879205.3.

* cited by examiner

APPARATUS AND METHOD FOR CONTROLLING MEASUREMENT OPERATIONS IN WIRELESS COMMUNICATION SYSTEM

CROSS-REFERENCE TO RELATED APPLICATION(S)

This application is based on and claims priority under 35 U.S.C. § 119(e) of a U.S. Provisional application Ser. No. 62/753,160, filed on Oct. 31, 2018, in the U.S. Patent and Trademark Office and under 35 U.S.C. § 119(a) of a Korean patent application number 10-2019-0129144, filed on Oct. 17, 2019, in the Korean Intellectual Property Office, the disclosure of each of which is incorporated by reference herein in its entirety.

BACKGROUND

1. Field

The disclosure relates to a wireless communication system. More particularly, the disclosure relates to an apparatus and method for controlling measurement operations in a wireless communication system.

2. Description of Related Art

To meet a demand for wireless data traffic that is on an increasing trend after the commercialization of 4th-generation (4G) communication systems, an effort to develop improved 5th-generation (5G) communication systems or pre-5G communication systems is being made. For this reason, the 5G communication systems or pre-5G communication systems are called beyond 4G network communication systems or post long term evolution (LTE) systems.

To accomplish a high data transmission rate, the 5G communication systems are in consideration of implementation at a band of ultra-high frequency (mmWave) (for example, a band of 60 Giga Hertz (GHz)). To alleviate a path loss of radio waves at the ultra-high frequency band and increase a propagation distance of the radio waves, the 5G communication systems are discussing beamforming, massive multiple input multiple output (MIMO), full dimensional-MIMO (FD-MIMO), array antenna, analog beamforming, and large scale antenna technologies.

Also, for the purpose of improvement of a system network, the 5G communication systems are achieving the development of technologies such as an evolved small cell, an advanced small cell, a cloud radio access network (cloud RAN), an ultra-dense network, device to device communication (D2D), wireless backhaul, a moving network, cooperative communication, coordinated multi-points (CoMP), received interference cancellation, etc.

In addition to these, the 5G systems are developing advanced coding modulation (ACM) schemes such as hybrid frequency shift keying and quadrature amplitude modulation (FQAM) and sliding window superposition coding (SWSC), and advanced connection technologies such as filter bank multi carrier (FBMC), non-orthogonal multiple access (NOMA), sparse code multiple access (SCMA), etc.

With the introduction of various new technologies into the 5G systems like this, in the early times, a base station of the existing 4G system (e.g., LTE, LTE-A) and a base station of the 5G system can coexist. Accordingly, various scenarios of using a plurality of connections by using all of the 4G system and the 5G system get to appear. In this case, there is a need to effectively control the connections with the respective systems.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for controlling a measurement operation of a terminal for a base station in a wireless communication system.

Another aspect of the disclosure is to provide an apparatus and method for effectively controlling a plurality of connections in a wireless communication system.

Another aspect of the disclosure is to provide an apparatus and method for effectively controlling a plurality of connections that are based on mutually different radio access technologies (RAT) in a wireless communication system.

Additional aspects will be set forth in part in the description which follows and, in part, will be apparent from the description, or may be learned by practice of the presented embodiments.

In accordance with an aspect of the disclosure, an operation method of a terminal in a wireless communication system is provided. The operation method includes receiving a message for controlling a measurement operation from a base station, and controlling a measurement operation based on the message. The message includes information indicating an object for application of the controlled measurement operation.

In accordance with another aspect of the disclosure, an operation method of a base station in a wireless communication system is provided. The operation method includes providing a message for controlling a measurement operation of a terminal, and transmitting the message to the terminal. The message includes information indicating an object for application of the controlled measurement operation.

In accordance with another aspect of the disclosure, a terminal in a wireless communication system is provided. The terminal includes a transceiver, and at least one processor connected with the transceiver. The at least one processor is configured to control the transceiver to receive a message for controlling a measurement operation from a base station, and control a measurement operation based on the message. The message includes information indicating an object for application of the controlled measurement operation.

In accordance with another aspect of the disclosure, a base station in a wireless communication system is provided. The base station includes a transceiver, and at least one processor connected with the transceiver. The at least one processor is configured to provide a message for controlling a measurement operation of a terminal, and control the transceiver to transmit the message to the terminal. The message includes information indicating an object for application of the controlled measurement operation.

An apparatus and method of various embodiments of the disclosure may decrease a battery consumption amount of a terminal more efficiently than a conventional terminal may do by its own battery consumption amount decrease operation, because a base station intervenes and controls the battery consumption amount.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
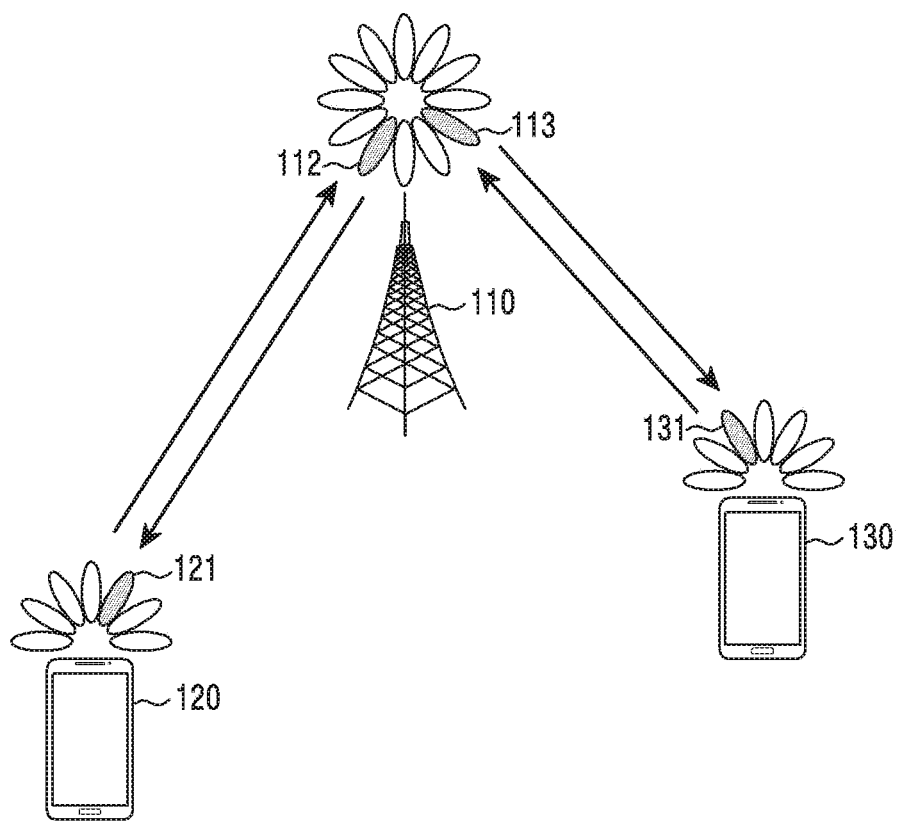
FIG. 1 illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In various embodiments of the disclosure described below, a hardware access method is explained as an example. However, various embodiments of the disclosure include a technology that uses all of hardware and software and therefore, various embodiments of the disclosure do not exclude a software based access method.

Below, the disclosure relates to an apparatus and method for controlling measurement operations in a wireless communication system. In detail, the disclosure describes a technology for restricting or allowing a measurement operation according to a state or operation of a terminal in a wireless communication system.

The term denoting a signal used in the following description, the term denoting a channel, the term denoting control information, the term denoting network entities, the term denoting a component of a device, etc. are to be exemplified for description convenience's sake. Accordingly, the disclosure is not limited to the terms described later, and may use other terms having equivalent technological meanings.

In the following description, a physical channel and a signal may be used interchangeably with data or a control signal. For example, a physical downlink shared channel (PDSCH) is the term denoting a physical channel over which data is transmitted, but the PDSCH may be used even to denote data. That is, in the disclosure, the expression 'transmitting a physical channel' may be interpreted equal to the expression 'transmitting data or a signal through a physical channel'.

In the disclosure below, upper signaling means a signal forwarding method of forwarding from a base station to a terminal by using a downlink data channel of a physical layer, or forwarding from the terminal to the base station by using an uplink data channel of the physical layer. The upper signaling may be understood as radio resource control (RRC) signaling or a media access control (MAC) control element (CE).

Also, in the disclosure, to identify whether a specific condition is satisfied or fulfilled, the expression of 'exceeding' or 'less than' has been used, but this is merely the mentioning for expressing an example, and does not exclude the mentioning of 'equal to or greater than' or 'equal to or less than'. A condition mentioned as 'equal to or greater than' may be replaced as 'exceeding', and a condition mentioned as 'equal to or less than' may be replaced as 'less than', and a condition mentioned as 'equal to or greater than and less than' may be replaced as 'exceeding and equal to or less than'.

Also, the disclosure explains various embodiments by using the terms used in some communication standards (e.g., 3rd generation partnership project (3GPP)), but these are just an example for explanation. Various embodiments of the disclosure may be easily modified and applied even in other communication systems.

FIG. 1 illustrates a wireless communication system according to an embodiment of the disclosure.

Referring to FIG. 1, FIG. 1 exemplifies a base station 110, a terminal 120 and a terminal 130 as some of nodes that use a wireless channel in the wireless communication system. FIG. 1 illustrates only one base station, but may further include another base station which is identical to or is similar with the base station 110.

The base station 110 is a network infrastructure providing a wireless connection to the terminals 120 and 130. The base station 110 has coverage which is defined as a predetermined geographical area on the basis of a distance capable of transmitting a signal. The base station 110 may be denoted as, besides a base station, an 'access point (AP)', an 'eNodeB (eNB)', a '5th generation (5G) node', a next generation node B (gNB), a 'wireless point', a 'transmission/reception point (TRP)' or other terms having technological meanings equivalent to these.

Each of the terminal 120 and the terminal 130 is a device used by a user, and performs communication with the base station 110 through a wireless channel. According to cases, at least one of the terminal 120 and the terminal 130 may be managed without user's engagement. That is, at least one of the terminal 120 and the terminal 130 is a device performing machine type communication (MTC), and may not be carried by the user. Each of the terminal 120 and the terminal 130 may be denoted as, besides a terminal, a 'user equipment (UE)', a 'mobile station', a 'subscriber station', a 'remote terminal', a 'wireless terminal', or a 'user device' or other terms having technological meanings equivalent to these.

The base station 110, the terminal 120, and the terminal 130 may transmit and receive a radio signal at a mmWave band (e.g., 28 GHz, 30 GHz, 38 GHz, and 60 GHz). At this time, for the sake of improvement of a channel gain, the base station 110, the terminal 120 and the terminal 130 may perform beamforming. Here, the beamforming may include transmission beamforming and reception beamforming. That is, the base station 110, the terminal 120 and the terminal 130 may grant directivity to a transmitted signal or a received signal. For this, the base station 110 and the terminals 120 and 130 may select serving beams 112, 113, 121 and 131 through a beam search or beam management procedure. After the serving beams 112, 113, 121, and 131 are selected, future communication may be performed through a resource which is in a quasi co-located (QCL) relation with a resource transmitting the serving beams 112, 113, 121, and 131.

In response to large-scale characteristics of a channel of forwarding a symbol on a first antenna port being inferred from a channel of forwarding a symbol on a second antenna port, it may be estimated that the first antenna port and the second antenna port are in a QCL relation. For example, the large-scale characteristics may include at least one of delay spread, Doppler spread, Doppler shift, average gain, average delay, and spatial receiver parameter.

Figure 2:
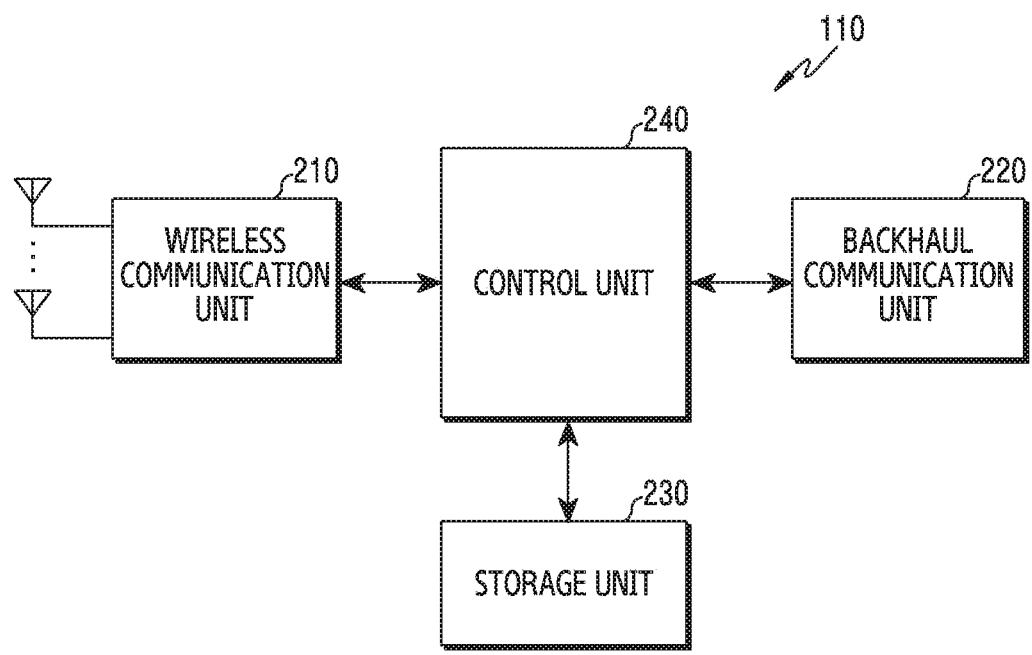
FIG. 2 illustrates a construction of a base station in a wireless communication system according to an embodiment of the disclosure.

FIG. 2 illustrates a construction of a base station in a wireless communication system according to an embodiment of the disclosure. The construction exemplified in FIG. 2 may be understood as a construction of the base station 110. The terms ' . . . unit', ' . . . er', etc. used below represent the unit of processing at least one function or operation. This may be implemented as hardware, software, or a combination of hardware and software.

Referring to FIG. 2, the base station includes a wireless communication unit 210, a backhaul communication unit 220, a storage unit 230, and a control unit 240.

The wireless communication unit 210 performs functions for transceiving a signal through a wireless channel. For example, the wireless communication unit 210 performs a function of conversion between a baseband signal and a bit stream in compliance with the physical layer standard of a system. For example, at data transmission, the wireless communication unit 210 provides complex symbols by encoding and modulating a transmission bit stream. Also, at data reception, the wireless communication unit 210 restores a reception bit stream by demodulating and decoding a baseband signal.

Also, the wireless communication unit 210 up converts a baseband signal into a radio frequency (RF) band signal and then transmits the RF band signal through an antenna, and down converts an RF band signal received through the antenna into a baseband signal. For this, the wireless communication unit 210 may include a transmission filter, a reception filter, an amplifier, a mixer, an oscillator, a digital to analog converter (DAC), an analog to digital converter (ADC), etc. Also, the wireless communication unit 210 may include a plurality of transceiving paths. Further, the wireless communication unit 210 may include at least one antenna array comprised of a plurality of antenna elements.

In aspect of hardware, the wireless communication unit 210 may be comprised of a digital unit and an analog unit. The analog unit may be comprised of a plurality of sub-units according to an operation power, an operation frequency, etc. The digital unit may be implemented as at least one processor (e.g., digital signal processor (DSP)).

The wireless communication unit 210 transmits and receives a signal as mentioned above. Accordingly, the entire or part of the wireless communication unit 210 may be denoted as a 'transmitter', a 'receiver' or a 'transceiver'. Also, in the following description, transmission and reception performed through a wireless channel are used as a meaning including that the aforementioned processing is performed by the wireless communication unit 210.

The backhaul communication unit 220 provides an interface for performing communication with other nodes in a network. That is, the backhaul communication unit 220 converts a bit stream sent from the base station to another node, for example, another connection node, another base station, an upper node, a core network, etc., into a physical signal, and converts a physical signal received from another node, into a bit stream.

The storage unit 230 stores data such as a basic program for an operation of the base station, an application program, setting information, etc. The storage unit 230 may consist of a volatile memory, a non-volatile memory, or a combination of the volatile memory and the non-volatile memory. And, the storage unit 230 provides the stored data in response to a request of the control unit 240.

The control unit 240 controls general operations of the base station. For example, the control unit 240 may transmit and receive a signal through the wireless communication unit 210 or the backhaul communication unit 220. Also, the control unit 240 records data in the storage unit 230, and reads. And, the control unit 240 may perform functions of a protocol stack required in the communication standard. In accordance with another implementation example, the protocol stack may be included in the wireless communication unit 210. For this, the control unit 240 may include at least one processor. In accordance with various embodiments, the control unit 240 may control the base station to perform operations of various embodiments described later.

Figure 3:
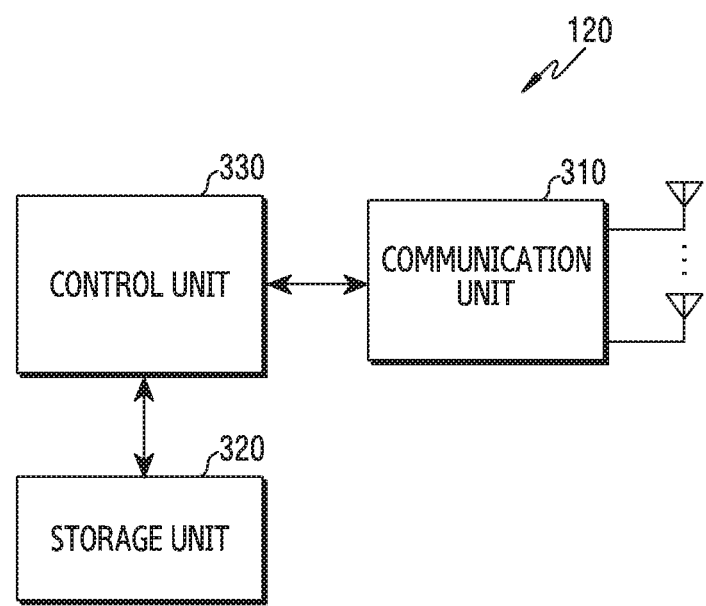
FIG. 3 illustrates a construction of a terminal in a wireless communication system according to an embodiment of the disclosure.

FIG. 3 illustrates a construction of a terminal in a wireless communication system according to an embodiment of the disclosure. The construction exemplified in FIG. 3 may be understood as a construction of the terminal 120. The terms ' . . . unit', ' . . . er', etc., used below represent the unit of processing at least one function or operation. This may be implemented as hardware, software, or a combination of hardware and software.

Referring to FIG. 3, the terminal includes a communication unit 310, a storage unit 320, and a control unit 330.

The communication unit 310 performs functions for transceiving a signal through a wireless channel. For example, the communication unit 310 performs a function of conversion between a baseband signal and a bit stream in compliance with the physical layer standard of a system. For example, at data transmission, the communication unit 310 provides complex symbols by encoding and modulating a transmission bit stream. Also, at data reception, the communication unit 310 restores a reception bit stream by demodulating and decoding a baseband signal. Also, the communication unit 310 up converts a baseband signal into an RF band signal and then transmits the RF band signal through an antenna, and down converts an RF band signal received through the antenna into a baseband signal. Furthermore, the communication unit 310 may include a transmission filter, a reception filter, an amplifier, a mixer, an oscillator, a DAC, an ADC, etc.

Also, the communication unit 310 may include a plurality of transceiving paths. Further, the communication unit 310 may include at least one antenna array comprised of a plurality of antenna elements. In aspect of hardware, the communication unit 310 may be comprised of a digital circuitry and an analog circuitry (e.g., a radio frequency integrated circuit (RFIC)). Here, the digital circuitry and the analog circuitry may be implemented as one package. Also, the communication unit 310 may include a plurality of RF chains. Furthermore, the communication unit 310 may perform beamforming.

Also, the communication unit 310 may include mutually different communication modules so as to process signals of mutually different frequency bands. Furthermore, the communication unit 310 may include a plurality of communication modules in order to support a mutually different plurality of wireless connection technologies. For example, the mutually different wireless connection technologies may include Bluetooth low energy (BLE), wireless fidelity (Wi-Fi), Wi-Fi gigabyte (WiGig), a cellular network (e.g., long term evolution (LTE), LTE-A, NR), etc. Also, the mutually different frequency bands may include a super high frequency (SHF) (e.g., 2.5 GHz, 5 GHz) band, and/or a millimeter (mm) wave (e.g., 60 GHz) band.

The communication unit 310 transmits and receives a signal as mentioned above. Accordingly, the entire or part of the communication unit 310 may be denoted as a 'transmitter', a 'receiver' or a 'transceiver'. Also, in the following description, transmission and reception performed through a wireless channel are used as a meaning including that the aforementioned processing is performed by the communication unit 310.

The storage unit 320 stores data such as a basic program for an operation of the terminal, an application program, setting information, etc. The storage unit 320 may consist of a volatile memory, a non-volatile memory, or a combination of the volatile memory and the non-volatile memory. And, the storage unit 320 provides the stored data in response to a request of the control unit 330.

The control unit 330 controls general operations of the terminal. For example, the control unit 330 transmits and receives a signal through the communication unit 310. Also, the control unit 330 records data in the storage unit 320, and reads. And, the control unit 330 may perform functions of a protocol stack required in the communication standard. For this, the control unit 330 may include at least one processor or microprocessor, or be part of the processor. Also, part of the communication unit 310 and the control unit 330 may be denoted as a communication processor (CP). In accordance with various embodiments, the control unit 330 may control the terminal to perform operations of various embodiments described later.

Figure 4:
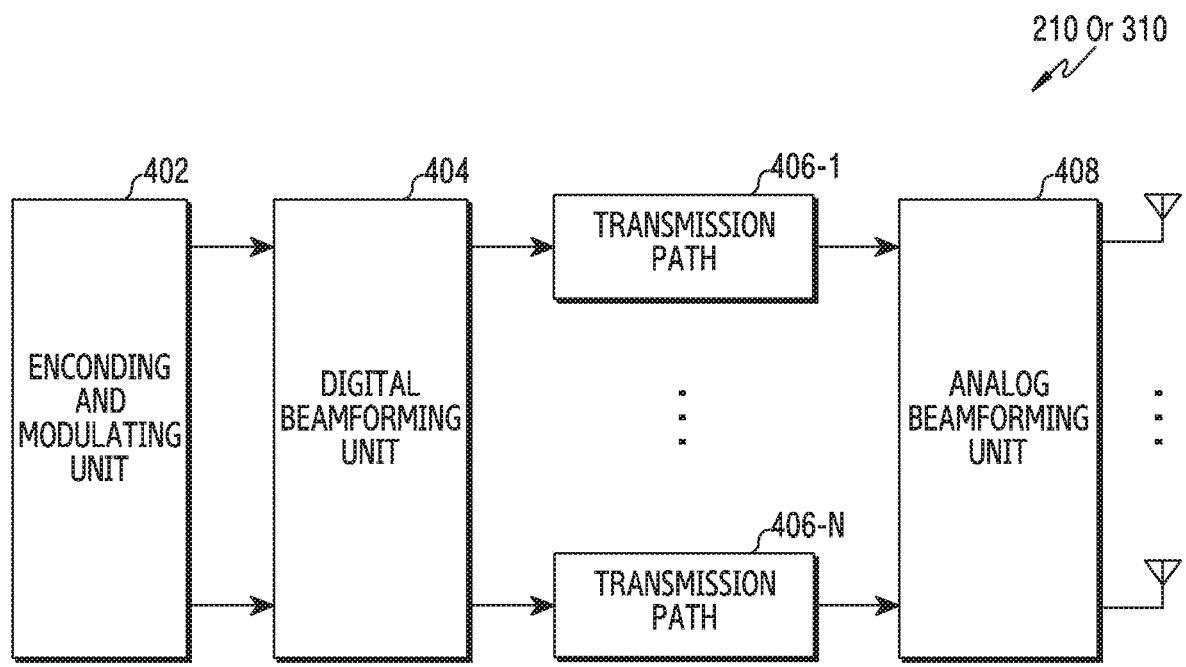
FIG. 4 illustrates a construction of a communication unit in a wireless communication system according to an embodiment of the disclosure.

FIG. 4 illustrates a construction of a communication unit in a wireless communication system according to an embodiment of the disclosure. FIG. 4 illustrates an example of a detailed construction of the wireless communication unit 210 of FIG. 2 or the communication unit 310 of FIG. 3. In detail, FIG. 4 exemplifies constituent elements for performing beamforming, as part of the wireless communication unit 210 of FIG. 2 or the communication unit 310 of FIG. 3.

Referring to FIG. 4, the wireless communication unit 210 or the communication unit 310 includes an encoding and modulating unit 402, a digital beamforming unit 404, a plurality of transmission paths 406-1 to 406-N, and an analog beamforming unit 408.

The encoding and modulating unit 402 performs channel encoding. For the sake of the channel encoding, at least one of a low density parity check (LDPC) code, a convolution code and a polar code may be used. By performing constellation mapping, the encoding and modulating unit 402 provides modulation symbols.

The digital beamforming unit 404 performs beamforming for a digital signal (e.g., modulation symbols). For this, the digital beamforming unit 404 multiplies the modulation symbols by beamforming weights. Here, the beamforming weights are used to alter a magnitude and phase of a signal, and may be denoted as a 'precoding matrix', a 'precoder', etc. The digital beamforming unit 404 outputs the digital-beamformed modulation symbols to a plurality of transmission paths 406-1 to 406-N. At this time, in compliance with a multiple input multiple output (MIMO) transmission technique, the modulation symbols may be multiplexed, or the same modulation symbols may be provided to the plurality of transmission paths 406-1 to 406-N.

The plurality of transmission paths 406-1 to 406-N convert the digital beamformed digital signals into an analog signal. For this, each of the plurality of transmission paths 406-1 to 406-N may include an inverse fast Fourier transform (IFFT) operation unit, a cyclic prefix (CP) inserting unit, a DAC, and an up converting unit. The CP inserting unit is for an orthogonal frequency division multiplexing (OFDM) scheme, and may be excluded in response to another physical layer scheme (e.g., filter bank multi-carrier (FBMC)) being applied. That is, the plurality of transmission paths 406-1 to 406-N provide an independent signal processing process for a plurality of streams provided through digital beamforming. However, in accordance with an implementation scheme, some of constituent elements of the plurality of transmission paths 406-1 to 406-N may be used commonly.

The analog beamforming unit 408 performs beamforming for an analog signal. For this, the analog beamforming unit 408 multiplies the analog signals by beamforming weights. Here, the beamforming weights are used to alter a magnitude and phase of a signal. In detail, the analog beamforming unit 408 may be constructed variously according to a coupling structure between the plurality of transmission paths 406-1 to 406-N and antennas. For example, each of the plurality of transmission paths 406-1 to 406-N may be coupled with one antenna array. For another example, the plurality of transmission paths 406-1 to 406-N may be coupled with one antenna array. For further example, the plurality of transmission paths 406-1 to 406-N may be adaptively coupled with one antenna array, or be coupled with two or more antenna arrays.

Figure 5:
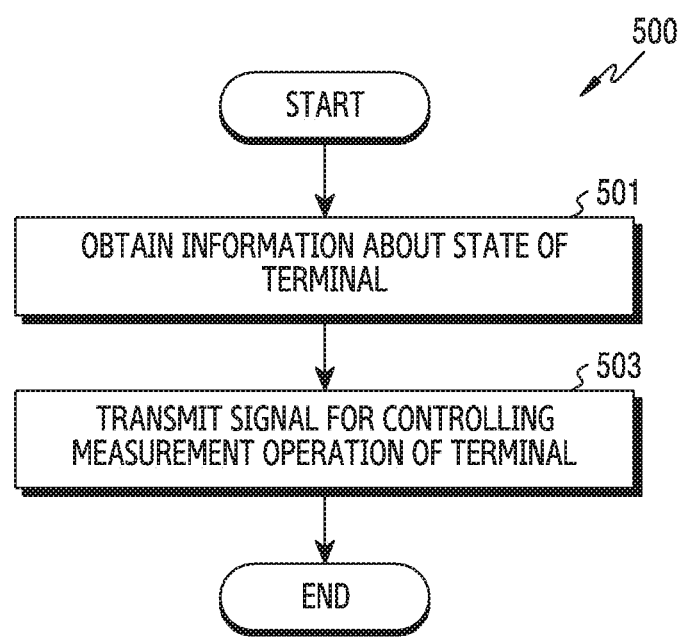
FIG. 5 illustrates a flowchart for measurement control of a base station in a wireless communication system according to an embodiment of the disclosure.

FIG. 5 illustrates a flowchart 500 for measurement control of a base station in a wireless communication system according to an embodiment of the disclosure. FIG. 5 exemplifies an operation method of the base station 110.

Referring to FIG. 5, in operation 501, the base station obtains information about a state of a terminal. For example, the information about the state of the terminal may include information related to traffic or data amount of the terminal, a data amount stored in a butter of the terminal, a service provided to the terminal, a mobility of the terminal or a battery of the terminal. In accordance with an embodiment, the base station may obtain the information about the terminal state from a message received from the terminal. In accordance with another embodiment, the base station may obtain the information about the terminal state from information obtained through another path, not signaling from the terminal.

In operation 503, the base station transmits a signal for controlling a measurement operation of the terminal. Here, the measurement may include radio resource measurement (RRM) measurement. For example, the signal may be an RRC message or a MAC CE. In accordance with an embodiment, the signal may indicate or request to restrict the measurement operation. In accordance with another embodiment, the signal may indicate or request to allow the measurement operation.

Figure 6:
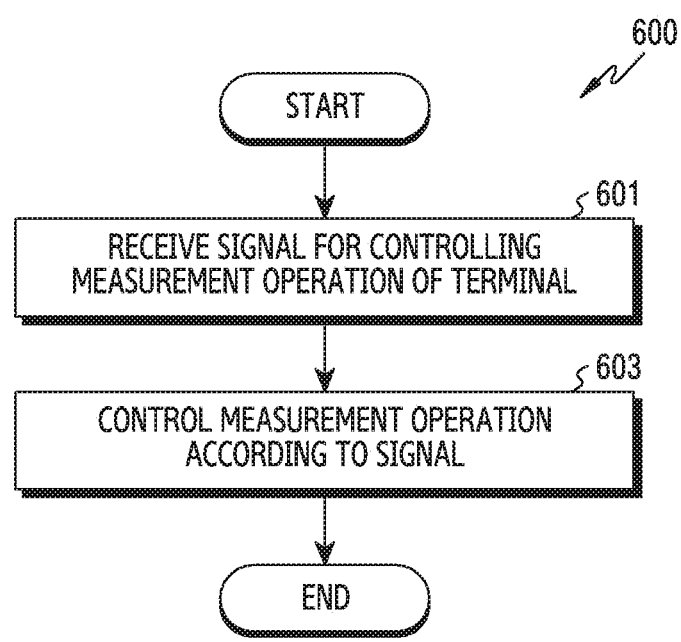
FIG. 6 illustrates a flowchart for measurement control of a terminal in a wireless communication system according to an embodiment of the disclosure.

FIG. 6 illustrates a flowchart 600 for measurement control of a terminal in a wireless communication system according to an embodiment of the disclosure. FIG. 6 exemplifies an operation method of the terminal 120.

Referring to FIG. 6, in operation 601, the terminal receives a signal for controlling a measurement operation of the terminal. For example, the signal may be an RRC message or a MAC CE. In accordance with an embodiment, the signal may indicate or request to restrict the measurement operation. In accordance with another embodiment, the signal may indicate or request to allow the measurement operation.

In operation 603, the terminal controls the measurement operation according to the signal. The terminal may control (e.g., suspending/resuming, cycle adjustment, interval adjustment, etc.) the measurement operation on the basis of the signal received in operation 601. For example, the terminal may suspend or resume a measurement operation for a base station. For another example, the terminal may increase or decrease a cycle of the measurement operation for the base station.

As in embodiments explained with reference to FIG. 5 and FIG. 6, a signal for restricting a measurement operation may be transmitted from the base station to the terminal. Here, the restricting of the measurement operation means the deactivation of measurement, the suspending of measurement, or a decrease of the number of measurement. That is, the signal may indicate the deactivation or suspending of measurement, or induce a decrease of the number of measurements. To indicate the deactivation or suspending of measurement, the signal may include a value corresponding to the deactivation or suspending. To induce the decrease of the number of measurements, the signal may include information (e.g., an increased cycle value or an increment value) for increasing a measurement cycle or information for altering a condition for measurement execution (e.g., altering into a stricter condition).

As in embodiments explained with reference to FIG. 5 and FIG. 6, a signal for allowing a measurement operation may be transmitted from the base station to the terminal. Here, the allowing of the measurement operation means the activation of measurement, the resuming of measurement, or an increase of the number of measurements. That is, the signal may indicate the activation or resuming of measurement, or induce an increase of the number of measurements. To indicate the activation or resuming of measurement, the signal may include a value corresponding to the activation or resuming. To induce the increase of the number of measurements, the signal may include information (e.g., a decreased cycle value or a decrement value) for decreasing a measurement cycle or information for altering a condition for measurement execution (e.g., altering into a softer condition).

In accordance with embodiments explained with reference to FIG. 5 and FIG. 6, the measurement operation of the terminal may be controlled. At this time, in accordance with an embodiment, the controlled measurement operation may be a measurement operation for a base station transmitting a signal, or be a measurement operation for another at least one base station. In this case, in accordance with an embodiment, the signal transmitted from the base station to the terminal may further include information about at least one base station which becomes an object of the measurement operation. For example, the another at least one base station may be one of remaining at least one base station excepting a base station transmitting a signal among a plurality of base stations forming a dual connectivity connection. A base station related to the controlled measurement operation may be indicated by one of identification information of the base station, a type of the base station, and an index used in a given base station set.

Also, in accordance with another embodiment, the controlled measurement operation may be specified by the unit of radio access technology (RAT), not the unit of base station. In this case, in response to a plurality of RATs being supported in one base station, measurement for the corresponding base station may be partially allowed or restricted. For example, a controlled object may be specified variously such as 5G, 4G, LTE, LTE-A, non-3GPP, etc.

Also, in accordance with another embodiment, the controlled measurement object may be specified by the unit of band or bandwidth part (BWP). Here, the controlled band or BWP may be indicated by a frequency value, a band number defined in the standard, and an index configured for a terminal.

As described above, a measurement operation of a terminal may be controlled according to signaling with a base station. At this time, the measurement operation controlled according to an indication of the base station may be restored according to need. An event or condition for the restoring of the measurement operation may be previously defined or be configured by the base station. Below, a description is made for embodiments in which the measurement operation is restored according to the achievement of the condition.

Figure 7:
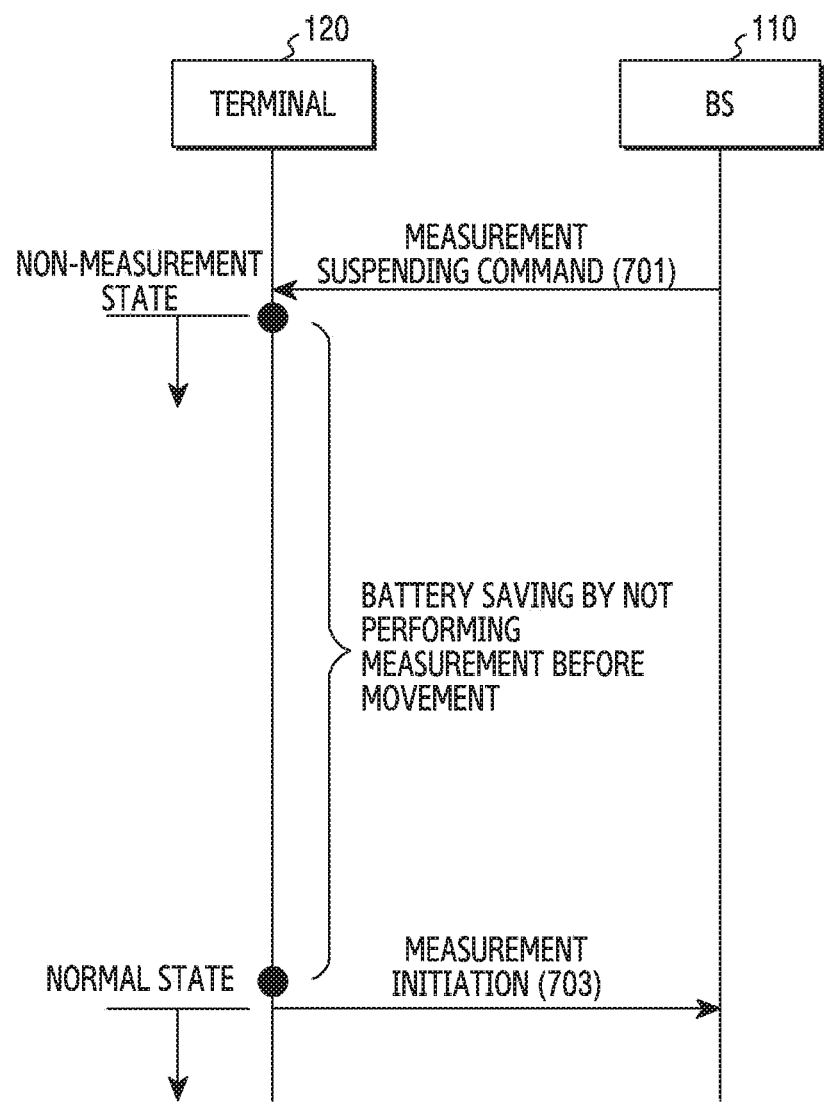
FIG. 7 illustrates a signal exchange for resuming measurement according to the movement of a terminal in a wireless communication system according to an embodiment of the disclosure.

FIG. 7 illustrates a signal exchange for resuming measurement according to the movement of a terminal in a wireless communication system according to an embodiment of the disclosure. FIG. 7 exemplifies a signal exchange between the base station 110 and the terminal 120.

Referring to FIG. 7, in operation 701, the base station 110 transmits a measurement suspending command to the terminal 120. For example, in response to the measurement suspending command indicating measurement suspending for the base station 110, the terminal 120 operates in a non-measurement state for the base station 110. For another example, in response to the measurement suspending command indicating measurement suspending for a specific RAT (e.g., 5G), the terminal 120 operates in a non-measurement state for a 5G cell. In operation 703, the terminal 120 transmits a message of notifying measurement initiation. By the movement of the terminal 120, the suspended measurement operation may be resumed again. However, in accordance with another embodiment, the message of notifying the measurement initiation may be omitted.

As in FIG. 7, the terminal 120 may not perform a measurement operation before being moved, thereby saving a battery. For this, the measurement suspending command transmitted in operation 701 may include information notifying a condition of measurement resuming. In such as FIG. 7, the measurement suspending command may include, as the information notifying the measurement resuming condition, information explicitly or implicitly indicating movement.

Figure 8:
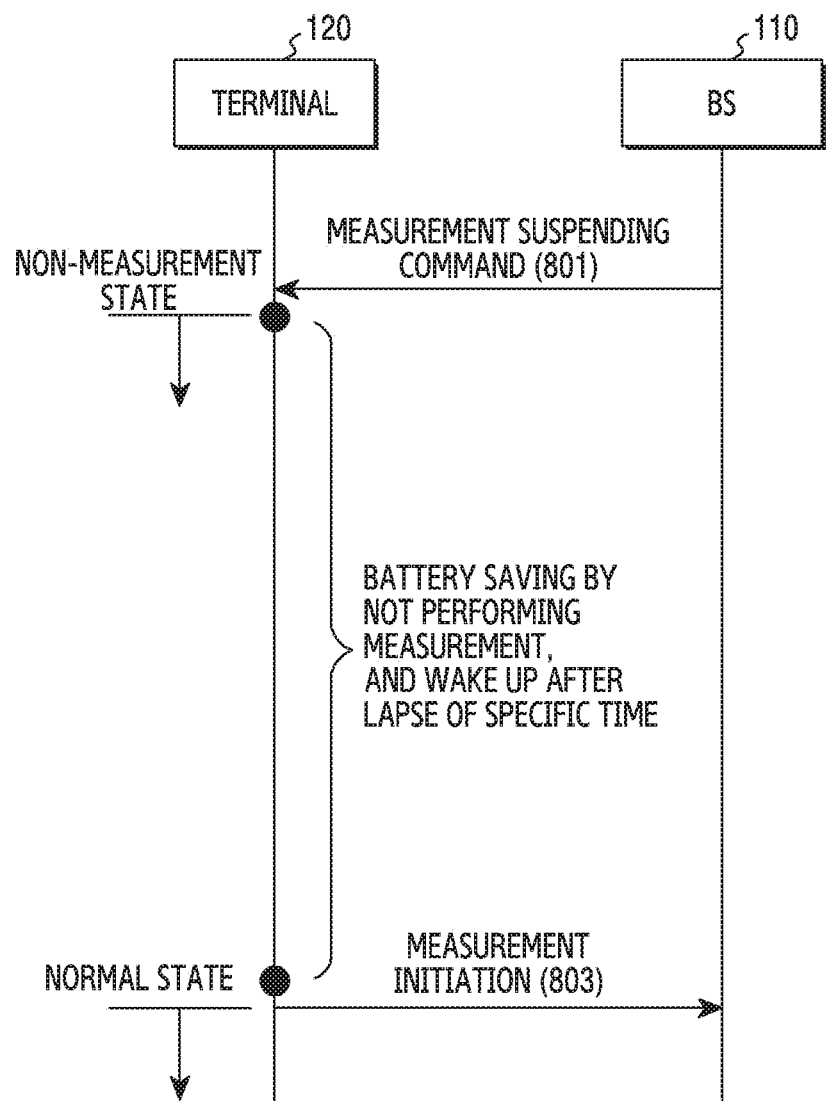
FIG. 8 illustrates a signal exchange for resuming measurement according to the expiration of a timer in a wireless communication system according to an embodiment of the disclosure.

FIG. 8 illustrates a signal exchange for resuming measurement according to the expiration of a timer in a wireless communication system according to an embodiment of the disclosure. FIG. 8 exemplifies a signal exchange between the base station 110 and the terminal 120.

Referring to FIG. 8, in operation 801, the base station 110 transmits a measurement suspending command to the terminal 120. For example, in response to the measurement suspending command indicating measurement suspending for the base station 110, the terminal 120 operates in a non-measurement state for the base station 110. For another example, in response to the measurement suspending command indicating measurement suspending for a specific RAT (e.g., 5G), the terminal 120 operates in a non-measurement state for a 5G cell. In operation 803, the terminal 120 transmits a message of notifying measurement initiation. By the lapse of a predetermined time, the suspended measurement operation may be resumed again. However, in accordance with another embodiment, the message of notifying the measurement initiation may be omitted.

As in FIG. 8, the terminal 120 does not perform a measurement operation before the lapse of a predetermined time, thereby saving a battery. For this, the measurement suspending command transmitted in operation 801 may include information notifying a predetermined time. In such as FIG. 8, the measurement suspending command may include, as the information notifying the time for measurement resuming, information explicitly or implicitly indicating a time duration value or timer value.

Figure 9:
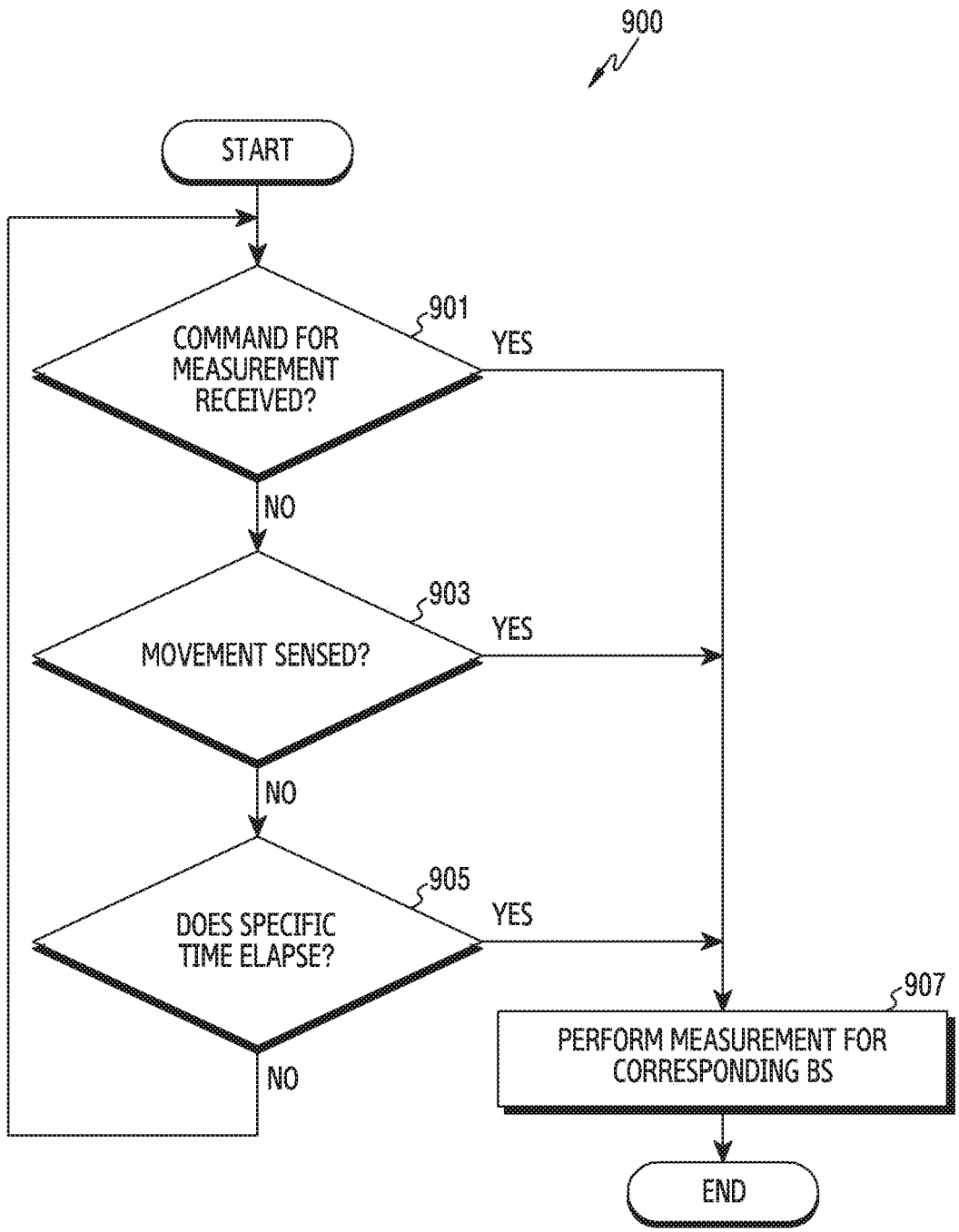
FIG. 9 illustrates a flowchart for resuming a measurement control operation of a terminal in a wireless communication system according to an embodiment of the disclosure.

FIG. 9 illustrates a flowchart 900 for resuming a measurement control operation of a terminal in a wireless communication system according to various embodiments of the disclosure. FIG. 9 exemplifies an operation method of the terminal 120. FIG. 9 represents an embodiment of considering all of a movement condition explained with reference to FIG. 7 and a time lapse condition explained with reference to FIG. 8.

Referring to FIG. 9, in operation 901, the terminal identifies whether a command for measurement is received. That is, even before a condition for measurement resuming is satisfied, in response to the command for measurement occurs, the terminal may resume a suspended measurement operation. In response to the command for measurement being received, the terminal proceeds to operation 907 below.

On the other hand, in response to the command for measurement not being received, in operation 903, the terminal identifies whether the movement of the terminal is sensed. For example, the movement may be identified based on at least one of a signal strength for a base station, and a sensing value obtained through a sensor installed in the terminal. In response to the movement being sensed, the terminal proceeds to operation 907 below.

On the other hand, in response to the movement not being sensed, in operation 905, the terminal identifies whether a specific time elapses. For example, the lapse of the specific time may be identified on the basis of the expiration of a timer. In response to the specific time not elapsing, the terminal returns to operation 901.

On the other hand, in response to the specific time elapsing, in operation 907, the terminal performs measurement for a corresponding base station. In other words, the terminal may resume the suspended measurement operation. Accordingly, the terminal may perform measurement for the corresponding base station, and transmit a measurement report including a measurement result. In accordance with another embodiment, the terminal may perform measurement for a corresponding RAT and/or a corresponding band.

An operation for control of a measurement operation of the above-described various embodiments may be expressed as in Table 1 below.

TABLE 1

Measurement object removal / notmeasure / continuemeasure
The UE shall:
1> for each measObjectId included in the received measObjectToRemoveList that is part of measObjectList in VarMeasConfig:

TABLE 1-continued

```
        2> remove the entry with the matching measObjectId from the
measObjectList within the VarMeasConfig;
        2> remove all measId associated with this measObjectId from the measIdList
within the VarMeasConfig, if any;
        2> if a measId is removed from the measIdList:
        3> remove the measurement reporting entry for this measId from the
VarMeasReportList, if included;
        3> stop the periodical reporting timer and reset the associated information
(e.g. timeToTrigger) for this measId.
        2> if the received notMeasureConfig:
        3> backup and remove all entry with the measObjectId from the
measObjectList within the VarMeasConfig;
        3> backup and remove all measID associated with this measObjectId from
the measIdList within the VarMeasConfig, if any;
        4> if a measId is removed from the measIdList:
        5> backup and remove all measurement reporting entry for this measId from
the VarMeasReportList, if included;
        6> stop all periodical reporting timer and reset the associated information
(e.g. timeToTrigger) for this measId.
        7> if the received continueMeasureConfig:
        7> if the UE detect moving:
        7> if the UE detect expiry of notMeasureTimer within notMeasureConfig:
        8> restore all entry with the measObjectId, all measID, all measurement
reporting entry which removed and continue measure
        NOTE:       The UE does not consider the message as erroneous if the
measObjectToRemoveList includes any measObjectId value that is not part of the
current UE configuration.
```

As described above, the terminal may resume the measurement operation according to the achievement of a configured condition or an indication from the base station. At this time, at resumed measurement, a configuration for measurement (e.g., a measurement item, a report cycle, a report item, etc.) may be the same as before suspending, or be different from before suspending. In response to being different from before suspending, the terminal may use a configuration defined as default, or follow a configuration separately provided. For example, the separately provided configuration may be provided at measurement suspending or be provided after measurement resuming.

In accordance with the above-described various embodiments, a measurement operation for a specific object may be controlled. The above-described embodiments have premised that the terminal has a single connectivity, but may consider even a situation in which the terminal has a plurality of connections like a DC. The DC that uses the plurality of connections is given as in FIG. 10 below.

Figure 10:
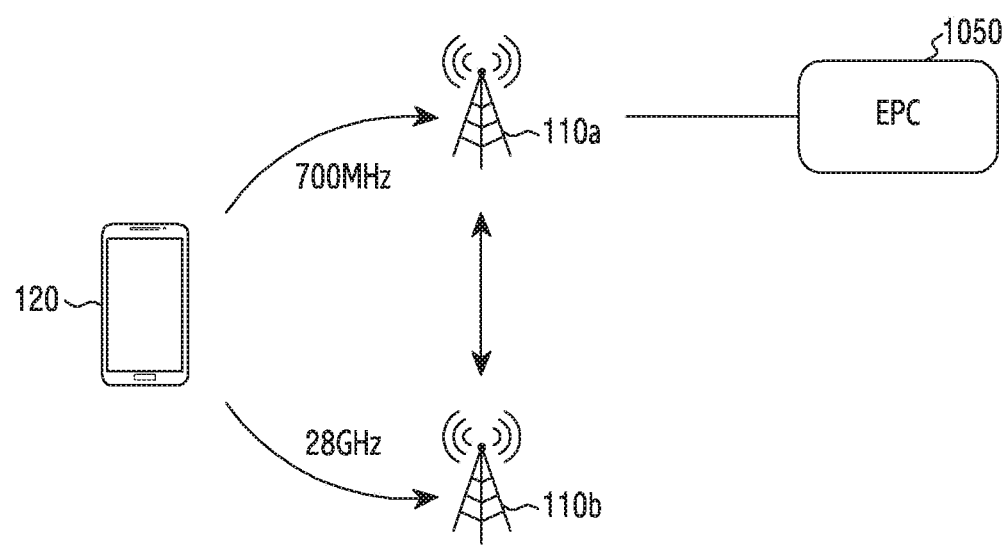
FIG. 10 illustrates an example of a dual connectivity (DC) operation in a wireless communication system according to an embodiment of the disclosure.

FIG. 10 illustrates an example of a DC operation in a wireless communication system according to various embodiments of the disclosure.

Referring to FIG. 10, the terminal 120 has a connection with each of the first base station 110a and the second base station 110b. And, the first base station 110a is connected with an evolved packet core (EPC) 1050. For example, the first base station 110a may be a long term evolution (LTE) base station which uses a 700 MHz band, and the second base station 110b may be a 5G base station which uses a 28 GHz band. The DC of this form may be denoted as a long term evolution-new radio dual connectivity (EN-DC). EN-DC is a technology of concurrently connecting to LTE and 5G, to support high capacity and high speed data transmission for a user.

In FIG. 10, the second base station 110b does not have a connection with a core network. That is, FIG. 10 exemplifies EN-DC in a non-standalone (NSA) environment. Accordingly, the first base station 110a operates a master base station, and the second base station 110b operates as a secondary base station. After the first base station 110a being the master base station or the second base station 110b being the secondary base station is connected with the terminal 120, each use state is checked on a point-to-point basis, to operate the terminal 120 in a discontinuous reception (DRX) mode, thereby being able to reduce the battery consumption of the terminal 120. A procedure of operating DRX in an EN-DC environment is exemplified in FIG. 11 below.

Figure 11:
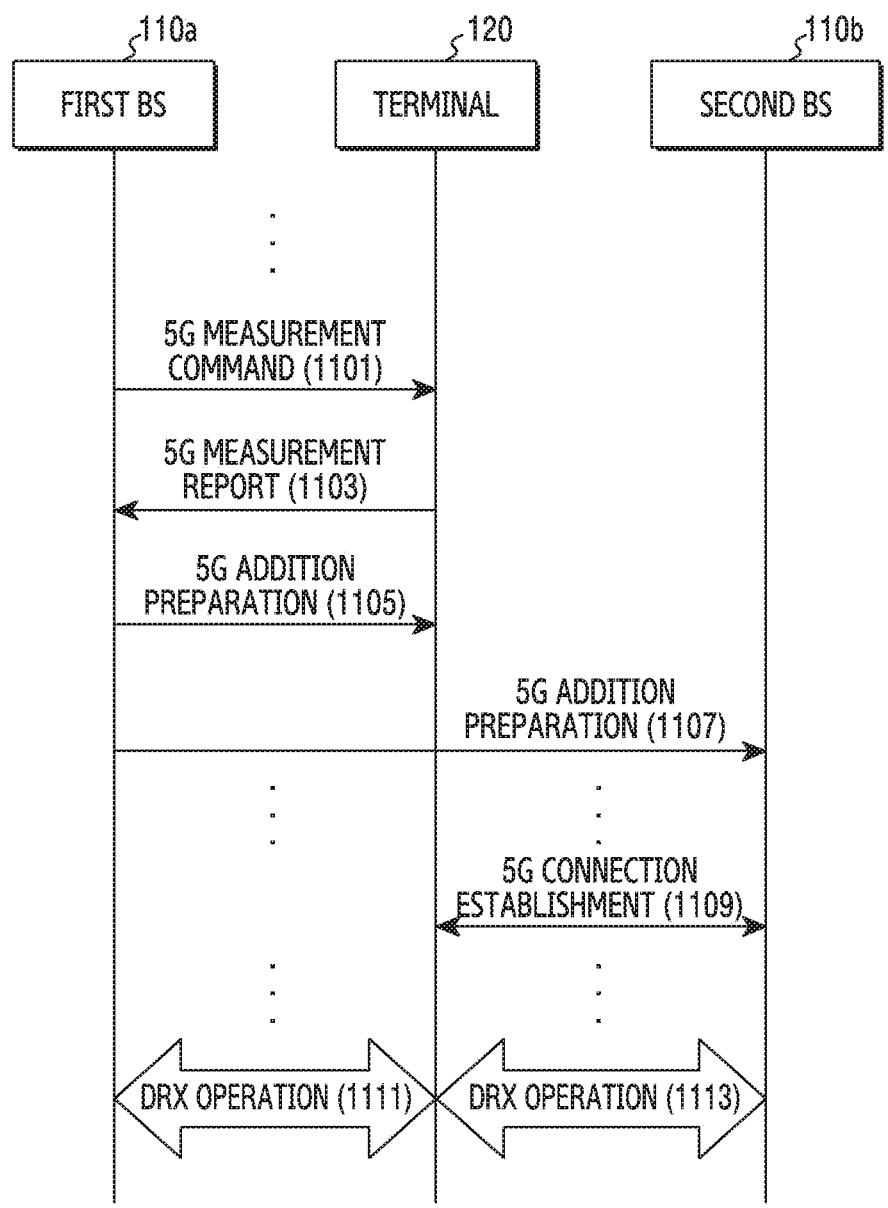
FIG. 11 illustrates a signal exchange for DC establishment in a wireless communication system according to an embodiment of the disclosure.

FIG. 11 illustrates a signal exchange for DC establishment in a wireless communication system according to an embodiment of the disclosure. FIG. 11 exemplifies a signal exchange among the first base station 110a, the second base station 110b, and the terminal 120.

Referring to FIG. 11, in operation 1101, the first base station 110a transmits a 5G measurement command to the terminal 120. Accordingly, in operation 1103, the terminal 120 performs measurement for the second base station 110b that is a 5G base station, and transmits a 5G measurement report including a measurement result. On the basis of the measurement result, the first base station 110a identifies the addition of a secondary base station. Accordingly, in operation 1105, the first base station 110a transmits a 5G addition preparation message to the terminal 120. Also, in operation 1107, the first base station 110a transmits a 5G addition preparation message to the second base station 110b. In operation 1109, the terminal 120 and the second base station 110b perform a procedure for establishing a connection. Thereafter, in operation 1111 and operation 1113, the terminal 120 performs a DRX operation for each of the first base station 110a and the second base station 110b according to an amount of 4G traffic or an amount of 5G traffic.

Figure 12:
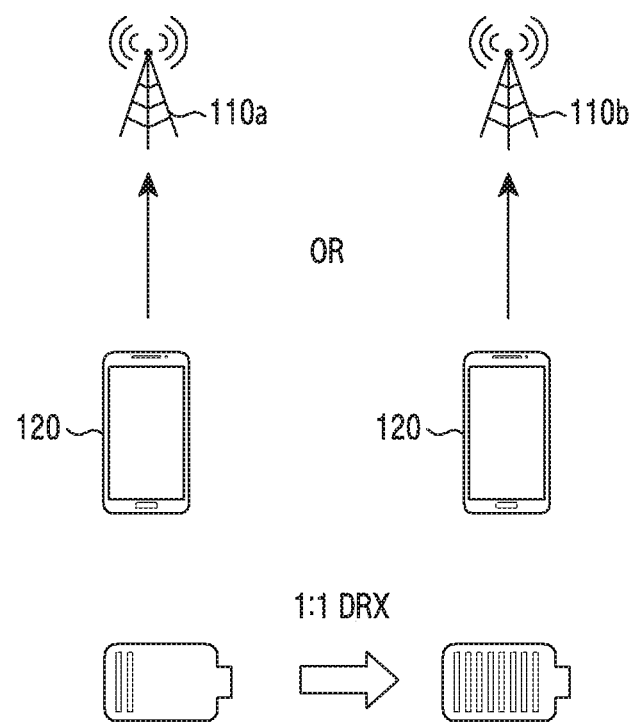
FIG. 12 illustrates a variation of a battery consumption amount dependent on a discontinuous reception (DRX) operation in a wireless communication system according to an embodiment of the disclosure.

FIG. 12 illustrates a variation of a battery consumption amount dependent on a DRX operation in a wireless communication system according to an embodiment of the disclosure.

Referring to FIG. 12, the DRX operation of the terminal 120 is performed independently for each of the first base station 110a and the second base station 110b. That is, the DRX operation may be performed in a point-to-point relation, and provide a predetermined battery saving effect.

In EN-DC being a technology of maintaining a plurality of connections, battery consumption may be large, because a terminal uses two radio circuits. Also, the conventional function of such as DRX decreasing battery consumption operates separately in each of 4G and 5G connections and does not affect each other. Therefore, the disclosure explains embodiments for saving a battery of a terminal in an EN-DC environment. In the following description, EN-DC is explained as an example, but embodiments described later may be applied in various situations of using a multiple connection of different heterogeneous RATs.

In accordance with an embodiment, when a 4G dedicated traffic is in an active state (e.g., voice over LTE (VoLTE)) and there is no or less traffic transceived through a 5G system, or when it is configured to release a connection even though there is a traffic in the 5G system, a base station temporarily releases a connection with a 5G base station, and suppresses even measurement for the 5G system, thereby being able to reduce battery consumption caused by a terminal's circuit (e.g., a 5G module) for communication with the 5G base station.

In accordance with another embodiment, even though connection has not yet been made with a 4G base station and a 5G base station, a base station suppresses measurement for a 5G system, thereby being able to reduce the battery consumption caused by the 5G module of the terminal.

For example, when both 4G and 5G are below 6 GHz, a battery use amount is large, because a terminal divides and uses uplink power for 4G and 5G, but VoLTE of a high 4G use amount has no need to particularly maintain a connection provided to a 5G system not used.

The terminal has, as in FIG. 13 below, a structure of supporting an EN-DC function of simultaneously connecting to an LTE base station being a master base station and a 5G base station being a secondary base station.

Figure 13:
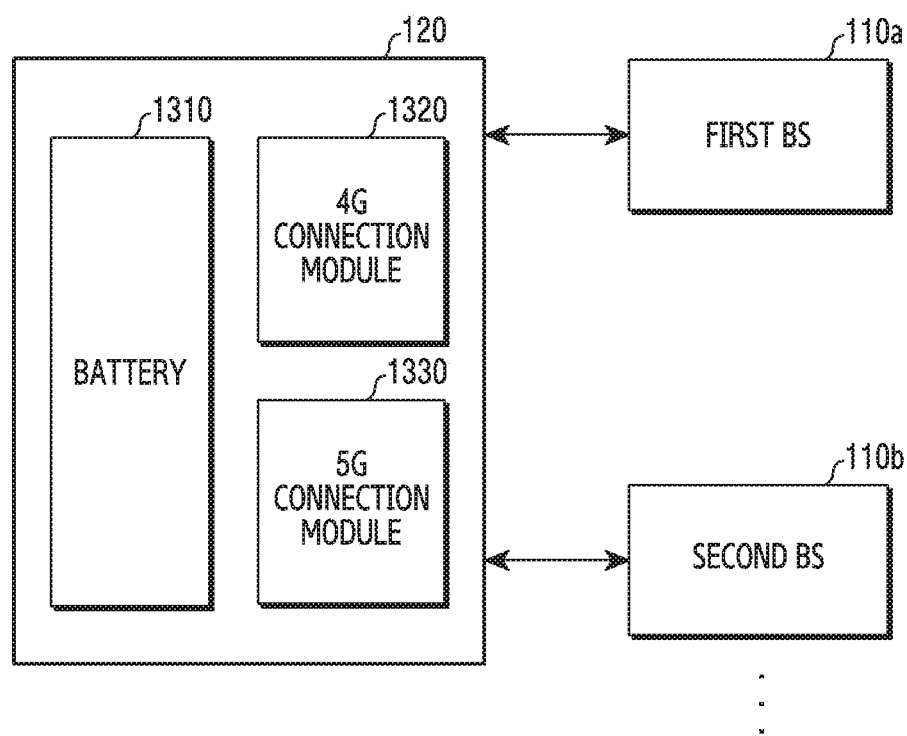
FIG. 13 illustrates a functional structure of a terminal for a DC operation in a wireless communication system according to an embodiment of the disclosure.

FIG. 13 illustrates a functional structure of a terminal for a DC operation in a wireless communication system according to an embodiment of the disclosure.

Referring to FIG. 13, the terminal 120 includes a battery 1310, a 4G connection module 1320, and a 5G connection module 1330. The battery 1310 may be a built-in type or an attachable type. The 4G connection module 1320 provides an interface of the 4G standard, and the 5G connection module 1330 provides an interface of the 5G standard. Accordingly, the terminal 120 may perform communication with the first base station 110a by using the 4G connection module 1320, and perform communication with the second base station 110b by using the 5G connection module 1330.

Figure 14:
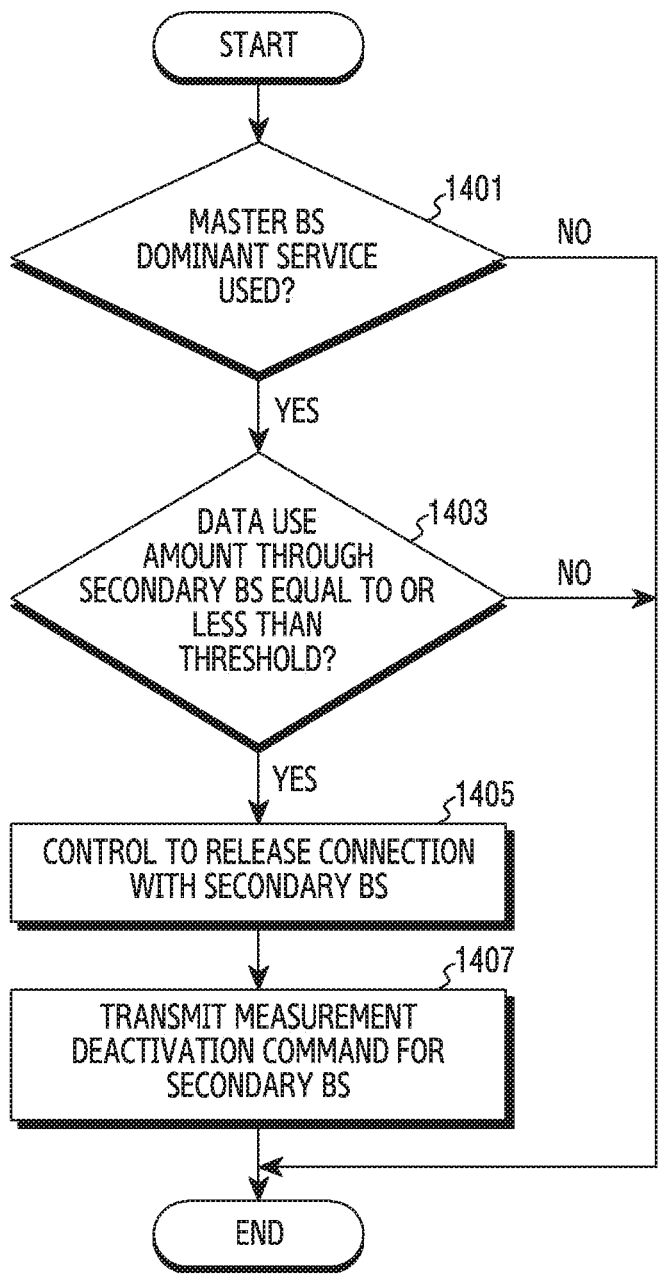
FIG. 14 illustrates a flowchart for controlling a secondary base station in a master base station in a wireless communication system according to an embodiment of the disclosure.

FIG. 14 illustrates a flowchart for controlling a secondary base station in a master base station in a wireless communication system according to an embodiment of the disclosure. FIG. 14 exemplifies an operation method of the first base station 110a which is the master base station.

Referring to FIG. 14, in operation 1401, the first base station identifies whether a terminal is using a master base station dominant service. Here, the master base station dominant service represents a service that is based on a RAT used for communication with the master base station. For example, in response to the first base station being a 4G base station, the master base station dominant service may be VoLTE.

In response to the terminal being using the master base station dominant service, in operation 1403, the first base station identifies whether a data use amount through a secondary base station is equal to or is less than a threshold. In response to the data use amount through the secondary base station being equal to or being less than the threshold, in operation 1405, the first base station controls to release a connection with the secondary base station. In operation 1407, the first base station transmits a measurement restriction command for the secondary base station. Here, the connection release of operation 1405 and the measurement restriction command of operation 1407 may be indicated by transmission of a single message or be indicated by separate messages.

In an embodiment explained with reference to FIG. 14, the first base station may release a connection with the secondary base station on the basis of the data use amount for the secondary base station. In accordance with another embodiment, the first base station may further consider a data use amount through the master base station. For example, the first base station may confirm a first data use amount of a terminal for the first base station being the master base station and a second data use amount of the terminal for the second base station being the secondary base station, and identify whether the first data use amount is equal to or is greater than a first threshold and the second data use amount is equal to or is less than a second threshold.

As explained with reference to FIG. 14, in response to an LTE base station being much used (e.g., VoLTE being used), and a data use amount through the 5G system being no or being slight equal to or less than a threshold, the base station may release a 5G connection of the terminal, and control not to perform measurement for the 5G system.

In response to a connection with a 5G base station being a secondary base station having been established, the connection is released, and a 4G base station being a master base station may instruct the terminal not to perform measurement.

Figure 15:
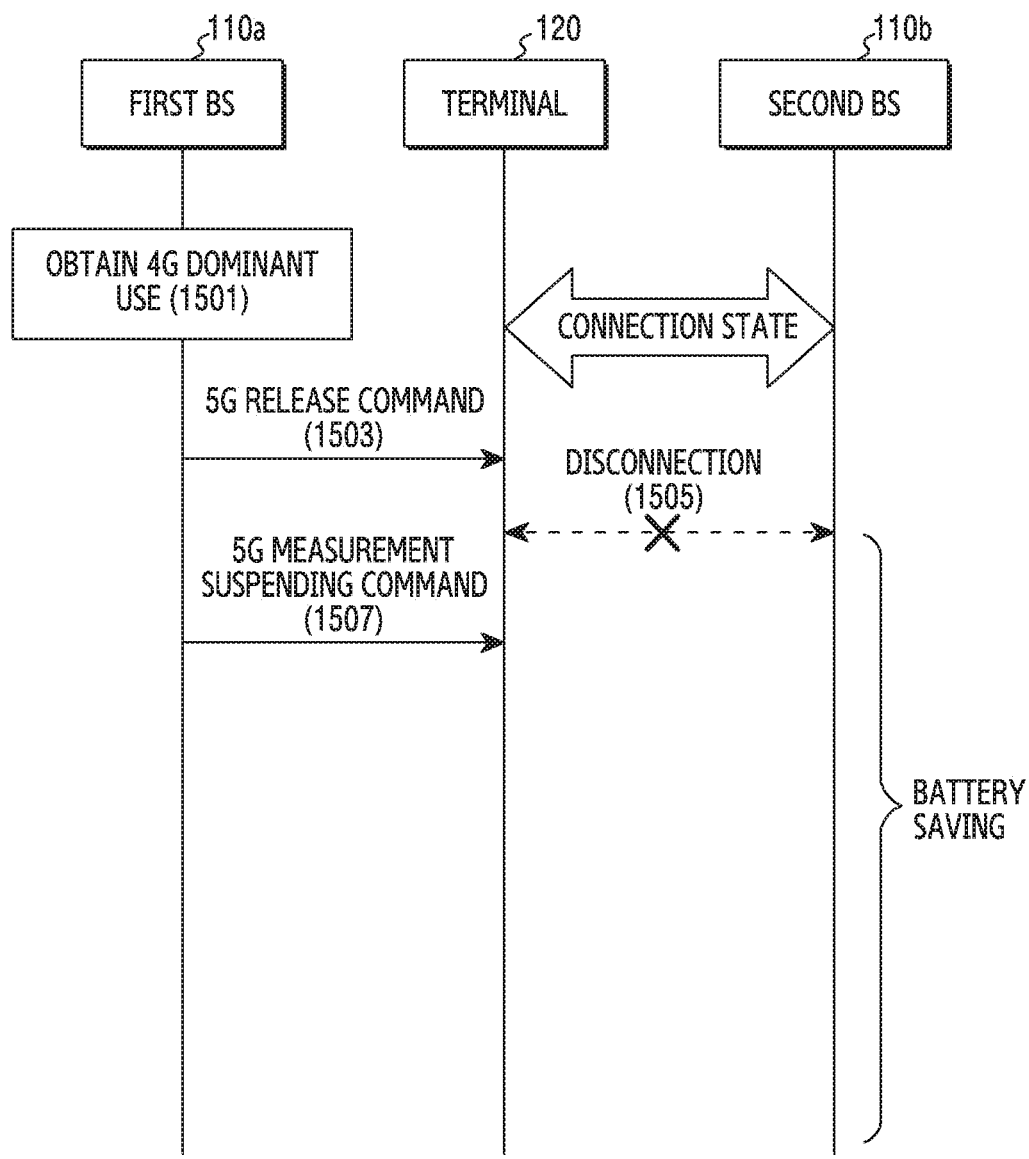
FIG. 15 illustrates a signal exchange for connection release and measurement suspending for a secondary base station by the control of a master base station in a wireless communication system according to an embodiment of the disclosure.

FIG. 15 illustrates a signal exchange for connection release and measurement suspending for a secondary base station by the control of a master base station in a wireless communication system according to various embodiments of the disclosure.

Referring to FIG. 15, in operation 1501, the first base station 110a obtains that the terminal 120 is using a 4G dominant service. At this time, the terminal 120 is in a state of maintaining a connection with the second base station 110b. Accordingly, in operation 1503, the first base station 110a transmits a 5G release command to the terminal 120. In operation 1505, the terminal 120 disconnects the connection with the second base station 110b. In operation 1507, the first base station 110a transmits a 5G measurement suspending command to the terminal 120.

Unlike the example of FIG. 15, in response to a connection with a 5G base station being a secondary base station not having been established, a 4G base station being a master base station may instruct a terminal not to perform measurement.

Figure 16:
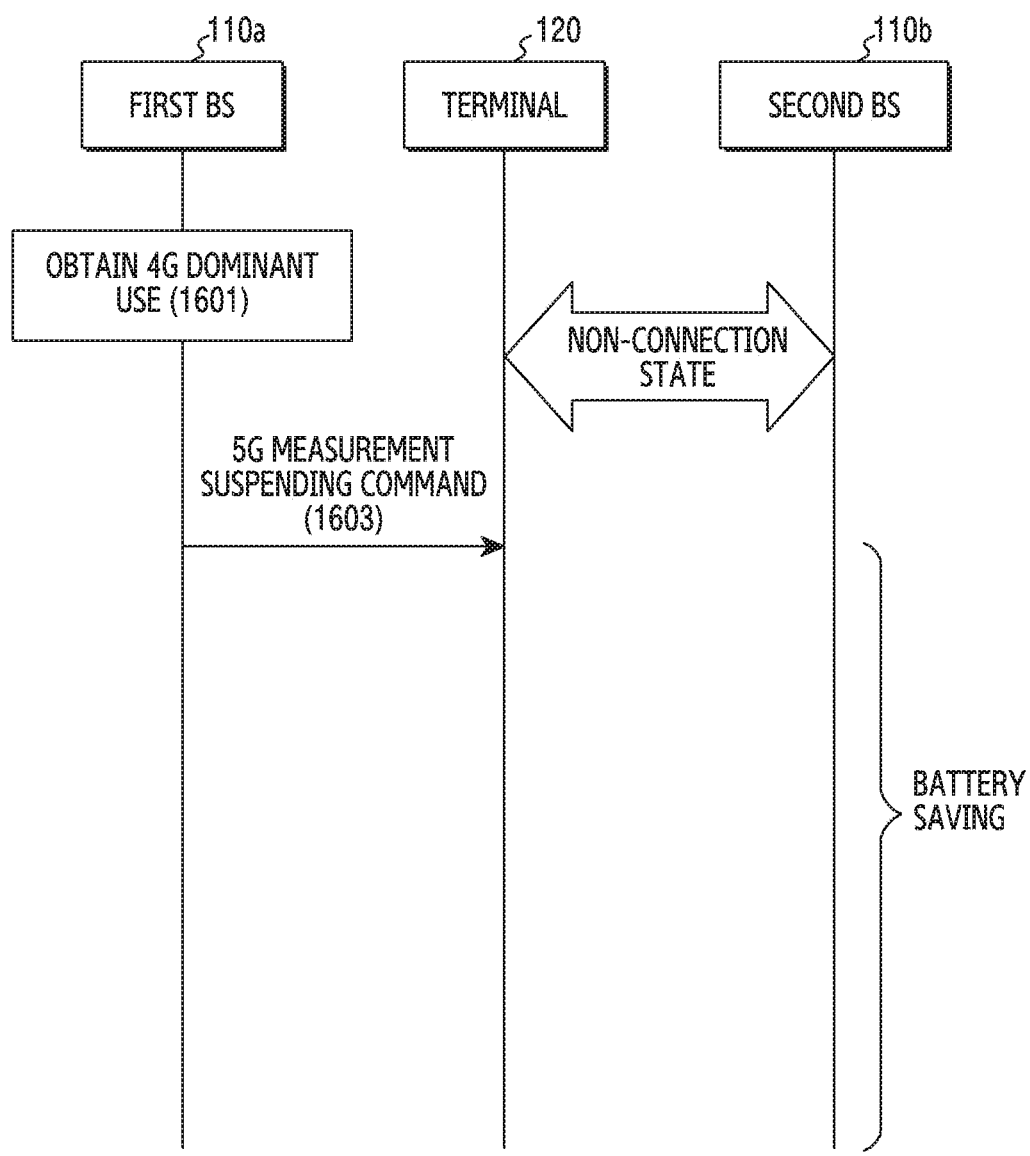
FIG. 16 illustrates a signal exchange for measurement suspending for a secondary base station by the control of a master base station in a wireless communication system according to an embodiment of the disclosure.

FIG. 16 illustrates a signal exchange for measurement suspending for a secondary base station by the control of a master base station in a wireless communication system according to various embodiments of the disclosure.

Referring to FIG. 16, in operation 1601, the first base station 110a obtains that the terminal 120 is using a 4G dominant service. At this time, the terminal 120 is in a state of not maintaining a connection with the second base station 110b. Accordingly, in operation 1603, the first base station 110a transmits a 5G measurement suspending command to the terminal 120.

A description for connection release and measurement suspending is made in more detail as follows.

5G Connection Release

1) In response to there being a split data radio bearer (DRB) (not a VoLTE bearer) that is using both 4G and 5G as a DC, a terminal may alter the split DRB into a master cell group (MCG)-DRB, and release a secondary cell group (SCG).

2) In response to there being a SCG-DRB that is using only 5G, the terminal may alter the SCG-DRB into the MCG-DRB.

For the sake of the above-described operations, at least one message (e.g., a radio resource control (RRC) message) between a master base station and a terminal may be transmitted and received. For example, an RRC reconfiguration message may be transmitted and received.

5G Measurement Suspending/Restriction

When a base station transmits an RRC reconfiguration message to a terminal as in Table 2 below, the base station may use measurement object list information about 5G in measurement configuration information. For example, the base station may eliminate the measurement object list information, or display a value (e.g., remove) of indicating measurement suspending/restriction. The terminal receives measObjectToRemoveList.

TABLE 2

5.5.2.4 Measurement object removal
The UE shall:
1> for each measObjectId included in the received
measObjectToRemoveList that is part of measObjectList in
VarMeasConfig:
2> remove the entry with the matching measObjectId from the
measObjectList within the VarMeasConfig;
2> remove all measId associated with this measObjectId from the
measIdList within the VarMeasConfig, if any;
2> if a measId is removed from the measIdList:
3> remove the measurement reporting entry
for this measId from the
VarMeasReportList, if included;
3> stop the periodical reporting timer and reset the associated information
(e.g. timeToTrigger) for this measId.

In accordance with the above-described embodiments, even in an environment in which one to two or more connections are established, the base stations may reduce the battery consumption of the terminal.

Figure 17:
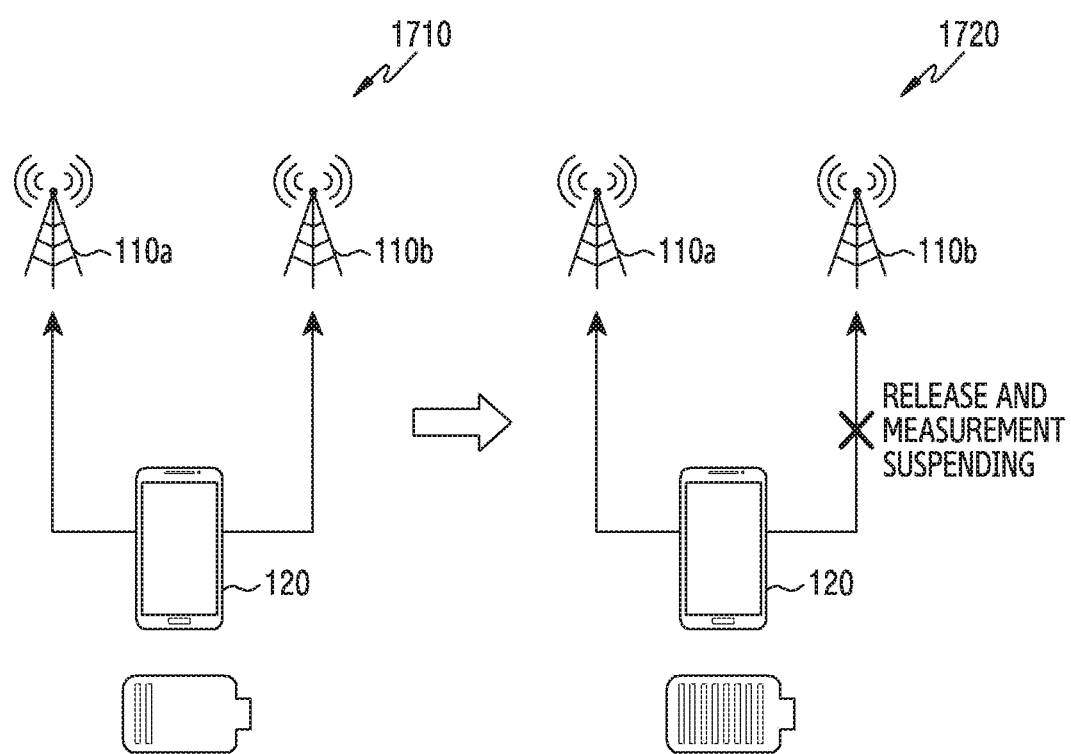
FIG. 17 illustrates a variation of a battery consumption amount caused by the controlling of a measurement operation in a wireless communication system according to an embodiment of the disclosure.

FIG. 17 illustrates a variation of a battery consumption amount caused by the controlling of a measurement operation in a wireless communication system according to an embodiment of the disclosure.

Referring to FIG. 17, while maintaining a plurality of connections with the first base station 110a and the second base station 110b to perform communication (as shown by 1710), the terminal 120 releases the connection with the second base station 110b which is a 5G base station, and suspends measurement for the second base station 110b (as shown by 1720), whereby a battery consumption amount is decreased.

Figure 18:
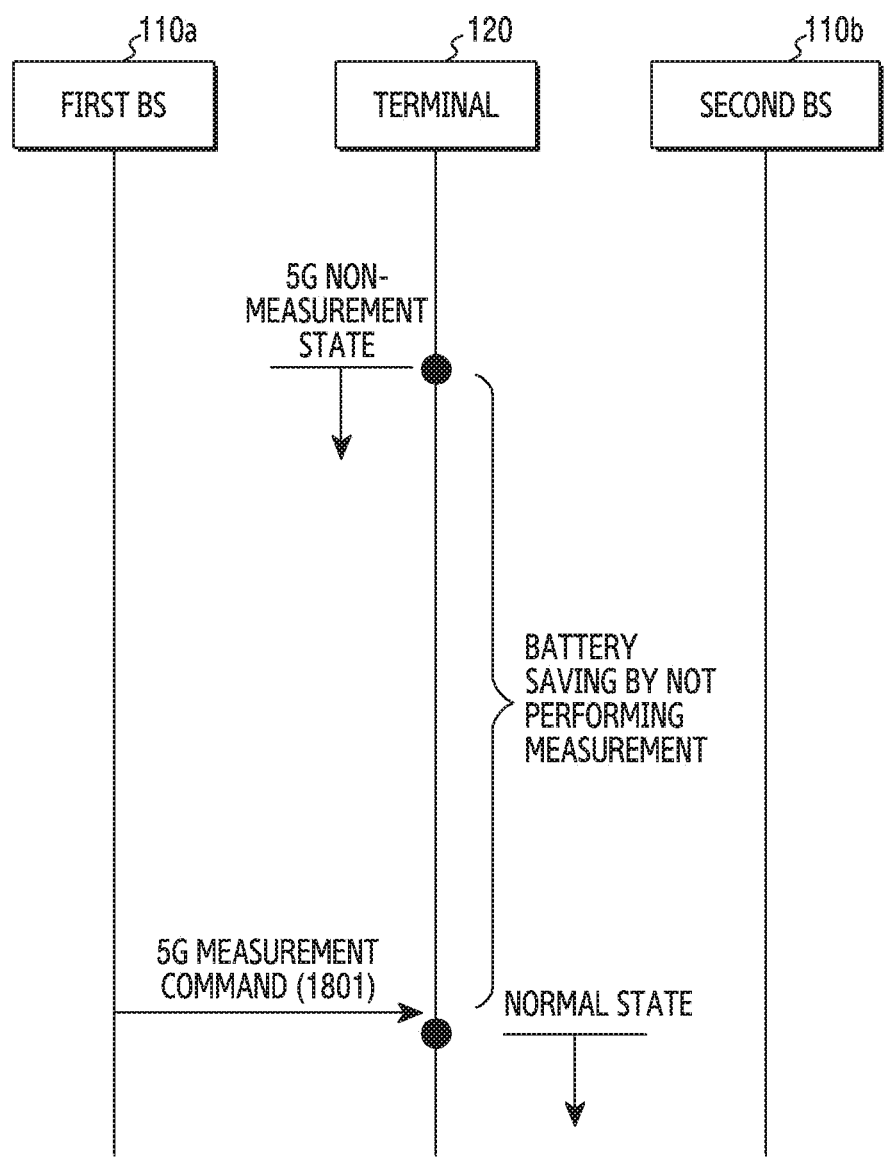
FIG. 18 illustrates a signal exchange for resuming measurement for a secondary base station by the control of a master base station in a wireless communication system according to an embodiment of the disclosure.

FIG. 18 illustrates a signal exchange for resuming measurement for a secondary base station by the control of a master base station in a wireless communication system according to an embodiment of the disclosure. FIG. 18 exemplifies a signal exchange between the terminal 120, the first base station 110a, and the second base station 110b.

Referring to FIG. 18, the terminal 120 operates in a 5G non-measurement state during a predetermined duration. That is, by not performing measurement during the predetermined duration, the terminal 120 may save a battery. During the non-measurement state, in operation 1801, the first base station 110a transmits a 5G measurement command to the terminal 120. Accordingly, the terminal 120 may transit to a normal status, and perform measurement for the second base station 110b which is a 5G base station.

As explained with reference to FIG. 18, a master base station may control the terminal to resume a suspended measurement operation for a secondary base station. Here, the measurement operation for the secondary base station may be resumed by various situation variations. For example, the situation variation may be related to the master base station, or be related to the secondary base station, or be related to both the master base station and the secondary base station. In accordance with an embodiment, in response to it being intended to distribute traffic to the secondary base station because of a decrease of an available resource of the master base station, the master base station may control the terminal to resume a measurement operation for the secondary base station in order to re-establish a connection between the secondary base station and the terminal. In accordance with another embodiment, in response to the terminal requesting for a service demanding a high throughput, the master base station may control the terminal to resume the measurement operation for the secondary base station in order to re-establish the connection between the secondary base station and the terminal.

Methods of embodiments mentioned in claims or specification of the disclosure may be implemented in the form of hardware, software, or a combination of the hardware and the software.

In case of being implemented by the software, a computer-readable storage media storing one or more programs (i.e., software modules) may be provided. The one or more programs stored in the computer-readable storage media are configured to be executable by one or more processors of an electronic device. The one or more programs include instructions for enabling the electronic device to execute the methods of the embodiments stated in the claims or specification of the disclosure.

These programs (i.e., software modules, software) may be stored in a random access memory (RAM), a non-volatile memory including a flash memory, a read only memory (ROM), an electrically erasable programmable ROM (EEPROM), a magnetic disc storage device, a compact disc-ROM (CD-ROM), digital versatile discs (DVDs), an optical storage device of another form, and/or a magnetic cassette. Or, the program may be stored in a memory that is configured in combination of some or all of them. Also, each configured memory may be included in plural as well.

Also, the program may be stored in an attachable storage device that may access through a communication network such as the Internet, an intranet, a local area network (LAN), a wireless LAN (WLAN) or a storage area network (SAN), or a communication network configured in combination of them. This storage device may access a device performing an embodiment of the disclosure through an external port. Also, a separate storage device on the communication network may access the device performing the embodiment of the disclosure as well.

In the aforementioned concrete embodiments of the disclosure, constituent elements included in the disclosure have been expressed in the singular or plural according to a proposed concrete embodiment. But, the expression of the singular or plural is selected suitable to a given situation for the sake of description convenience, and the disclosure is not limited to singular or plural constituent elements. Even a constituent element expressed in the plural may be constructed in the singular, or even a constituent element expressed in the singular may be constructed in the plural.

While a detailed description of the disclosure has been made for a concrete embodiment, it is undoubted that various modifications are available without departing from the scope of the disclosure. Therefore, the scope of the disclosure should not be limited to and defined by the explained embodiment and should be defined by not only the scope of claims mentioned below but also equivalents to the scope of these claims.

What is claimed is:

1. A method performed by a terminal in a wireless communication system, the method comprising:
   transmitting, to a master base station, a first message including state information of the terminal, wherein the state information comprises information on an amount of data associated with a secondary base station for the terminal;
   receiving, from the master base station providing a first radio access technology (RAT), a second message including information on controlling a measurement of the terminal associated with the secondary base station providing a second RAT different from the first RAT and information on releasing a connection with the secondary base station according to the first message; and
   performing the releasing of the connection with the secondary base station and the controlling a deactivation of the measurement for the secondary base station based on the second message,
   wherein the information on controlling the measurement includes an object of the measurement associated with the secondary base station and a timer for the deactivation.

2. The method of claim 1,
   wherein the first RAT is designated as a 4G ($4^{th}$ generation), and
   wherein the second RAT is designated as a 5G ($5^{th}$ generation).

3. The method of claim 1, further comprising:
   in response to a condition previously defined or configured by the master base station being satisfied, controlling activation of the deactivated measurement based on the second message.

4. The method of claim 3, wherein the condition comprises at least one of a movement of the terminal.

5. The method of claim 1, further comprising:
   controlling activation of the deactivated measurement based on the timer for the deactivation,
   wherein the information on the timer comprises expiration time for the deactivation of the measurement.

6. The method of claim 1,
   wherein the first message further includes an amount of data associated with the master base station for the terminal, and
   wherein performing the releasing of the connection with the secondary base station and the controlling the deactivation of the measurement further comprises:
   in case that identifying the amount of data associated with the master base station is greater than a first threshold and the amount of data associated with the secondary base station is less than a second threshold, performing the releasing of the connection with the secondary base station and the controlling the deactivation of the measurement.

7. The method of claim 1,
   wherein the information on releasing the connection comprises information for changing from split data radio bearer (DRB) for dual connectivity to master cell group (MCG)-DRB and releasing secondary cell group (SCG)-DRB.

8. A method performed by a master base station providing a first radio access technology (RAT) in a wireless communication system, the method comprising:
   receiving, from a terminal, a first message including state information of the terminal, wherein the state information comprises information on an amount of data associated with a secondary base station for the terminal;
   generating a second message including information on controlling a measurement of the terminal associated with the secondary base station providing a second RAT different from the first RAT and information on releasing a connection with the secondary base station based on the first message; and
   transmitting the second message to the terminal,
   wherein the information on controlling the measurement includes an object of the measurement associated with the secondary base station and information on a timer for a deactivation of the measurement.

9. The method of claim 8, wherein the information on the timer comprises expiration timer for the deactivation of the measurement.

10. The method of claim 8,
    wherein the information on releasing the connection comprises information for changing from split data radio bearer (DRB) for dual connectivity to master cell group (MCG)-DRB and releasing secondary cell group (SCG)-DRB.

11. The method of claim 8,
    wherein the first RAT is designated as a 4G ($4^{th}$ generation), and
    wherein the second RAT is designated as a 5G ($5^{th}$ generation).

12. The method of claim 8,
    wherein the first message further includes an amount of data associated with the master base station for the terminal, and
    wherein the second message is generated in case that identifying the amount of data associated with the master base station is greater than a first threshold and the amount of data associated with the secondary base station is less than a second threshold based on the first message.

13. A terminal in a wireless communication system, the terminal comprising:
    a transceiver; and
    at least one processor coupled with the transceiver and configured to:
    transmit, to a master base station, a first message including state information of the terminal, wherein the state information comprises information on an amount of data associated with a secondary base station for the terminal
    receive, from the master base station providing a first radio access technology (RAT), a second message including information on controlling a measurement of the terminal associated with the secondary base station providing a second RAT different from the first RAT and information on releasing a connection with the secondary base station according to the first message, and
    perform the releasing of the connection with the secondary base station and the controlling a deactivation of the measurement for the secondary base station based on the second message, wherein the information on controlling the measurement includes an object of the measurement associated with the secondary base station and information on a timer for the deactivation.

14. The terminal of claim 13,
wherein the first RAT is designated as a 4G ($4^{th}$ generation), and
wherein the second RAT is designated as a 5G ($5^{th}$ generation).

15. The terminal of claim 13, wherein, in response to a condition previously defined or configured by master the base station being satisfied, the at least one processor is further configured to control activation of the deactivated measurement based on the second message.

16. The terminal of claim 15, wherein the condition comprises at least one of a movement of the terminal.

17. The terminal of claim 13,
wherein the at least one processor is further configured to, control activation of the deactivated measurement based on the timer for the deactivation, and
wherein the information on the timer comprises expiration time for the deactivation of the measurement.

18. The terminal of claim 13,
wherein the first message further includes an amount of data associated with the master base station for the terminal, and
wherein the at least one processor is further configured to, in case that identifying the amount of data associated with the master base station is greater than a first threshold and the amount of data associated with the secondary base station is less than a second threshold, perform the releasing of the connection with the secondary base station and the controlling the deactivation of the measurement.

19. The terminal of claim 13,
wherein the information on releasing the connection comprises information for changing from split data radio bearer (DRB) for dual connectivity to master cell group (MCG)-DRB and releasing secondary cell group (SCG)-DRB.

\* \* \* \* \*